Dec. 29, 1925. 1,567,427
J. M. DORTON
DIRIGIBLE HEADLIGHT
Filed Sept. 2, 1924 2 Sheets-Sheet 1
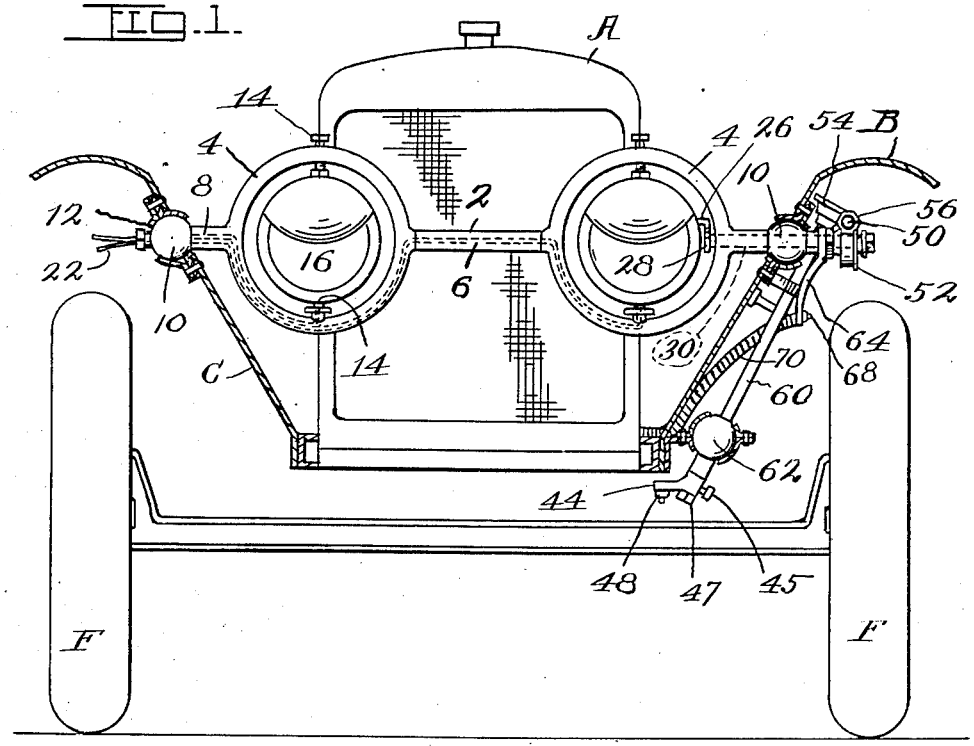
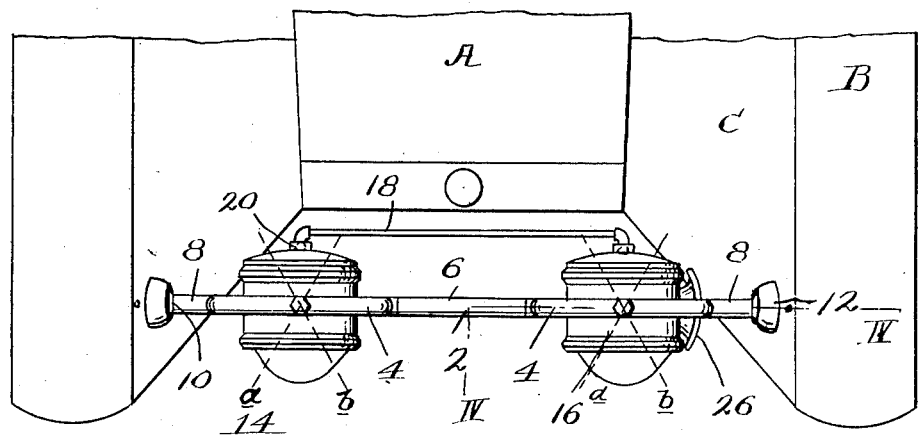
Inventor:
John M. Dorton,
By F. G. Fischer,
Attorney.
Witness:
Fred C. Fischer.

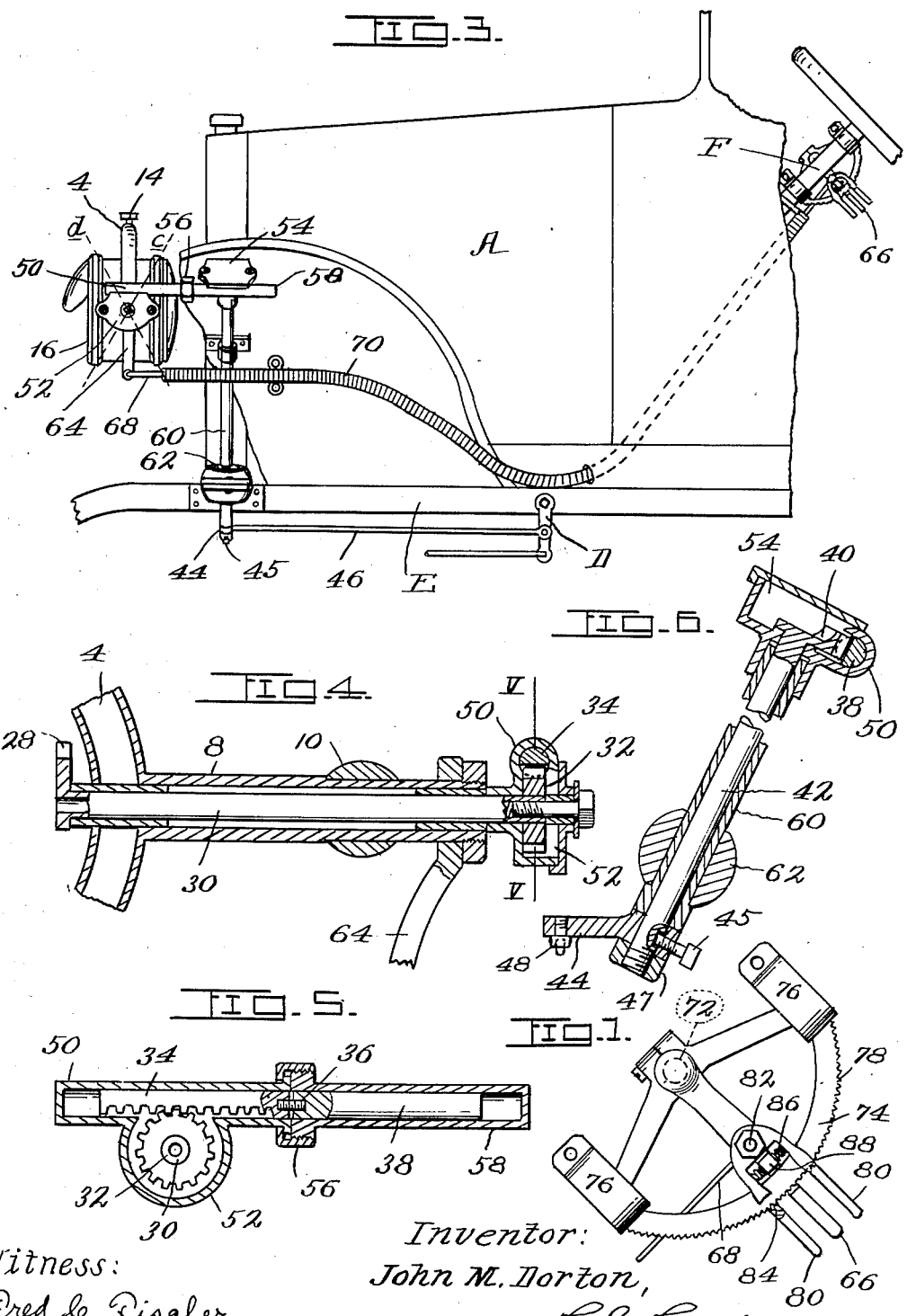

Patented Dec. 29, 1925.

1,567,427

UNITED STATES PATENT OFFICE.

JOHN M. DORTON, OF BONNER SPRINGS, KANSAS.

DIRIGIBLE HEADLIGHT.

Application filed September 2, 1924. Serial No. 735,242.

*To all whom it may concern:*

Be it known that I, JOHN M. DORTON, a citizen of the United States, residing at Bonner Springs, in the county of Wyandotte and State of Kansas, have invented certain new and useful Improvements in Dirigible Headlights, of which the following is a specification.

My invention relates to dirigible headlights for motor vehicles and embodies mechanism connecting said headlights to the steering mechanism, so that the headlights will be automatically controlled to throw rays of light in advance of the vehicle and in the direction of travel when the vehicle is pursuing a straight course or rounding curves in the road.

The invention further embodies manually controlled mechanism whereby the driver may tilt the headlights up and down to cast the light rays accordingly, without leaving his seat in the vehicle.

Other features will hereinafter appear, and in order that the invention may be fully understood, reference will now be had to the accompanying drawings, in which:

Fig. 1 shows the forward portion of a motor vehicle equipped with the invention.

Fig. 2 is a broken plan view showing some of the parts disclosed by Fig. 1.

Fig. 3 is a fragmentary side elevation of the motor vehicle equipped with the invention.

Fig. 4 is an enlarged fragmentary sectional detail on line IV of Fig. 2, with the fender removed and showing a portion of the mechanism for controlling the headlights.

Fig. 5 is a vertical longitudinal section on line V—V of Fig. 4.

Fig. 6 is a broken longitudinal section of a part of the mechanism for automatically turning the headlights to the right or left.

Fig. 7 is an enlarged side elevation of a manually controlled lever for tilting the headlights up and down.

Referring now in detail to the various parts disclosed by the drawings, A, designates the forward portion of a motor vehicle equipped with the usual front fenders B and aprons C.

2 designates an adjustable headlight frame mounted at the forward portion of the motor vehicle A and consisting of a pair of annular members 4, a transverse bar 6 uniting said annular members 4, and a pair of trunnions 8 projecting from the annular members 4 and terminating in balls 10. The balls 10 are rockably mounted in sockets 12, which are firmly secured to the aprons C of the fenders B. The balls 10 permit the sockets 12 to be adjusted to fender aprons arranged at different inclinations and also provide axes on which the frame 2 may rock, as will hereinafter appear.

The annular members 4 of the frame 2 are provided with vertical axes 14 upon which the headlights 16 are mounted to turn to the right or left. The headlights 16 are connected to turn together by a rod 18, which is connected to the rear central portions of said headlights 16, by ball and socket joints 20. The frame 2 is preferably made of tubing so that the electric wiring 22 may be run therethrough to the headlights 16.

The mechanism whereby the headlights 16 are automatically turned to the right or left as indicated by dotted lines *a* and *b*, Fig. 2, will now be described. 26 designates a rack fixed to the side of the headlight 16 adjacent to the steering mechanism. Said rack 26 is of arcuate form in plan view, the arc being struck from the vertical axes 14 upon which the headlight turns, so that the rack 26 will remain in mesh with a segmental gear 28, whereby it is moved forwardly or backwardly. The gear 28 is fixed upon one end of a shaft 30, Figs. 1 and 4, journaled in the adjacent portion of the frame 2 and provided at its opposite end with a fixedly mounted pinion 32 intermeshing with a rack 34, Figs. 4 and 5, which has a swivel connection 36 with another rack 38, intermeshing with a segmental gear 40, Fig. 6, fixed upon the upper end of a shaft 42 provided at its lower end with a fixedly-mounted arm 44 secured to the forward end of a connecting rod 46 by suitable means such as a universal joint 48. The connecting rod 46 is operably-connected at its rear end to a suitable portion of the steering mechanism such as the crank arm D. The arm 44 is secured to the shaft 42 by a set screw 45 and nut 47. On loosening the set screw 45 and the nut 47 and the arm 44 can be turned forward or backward upon the shaft 42 to accommodate variations in distance, which exist in different types of motor vehicles, between the arm D and the shaft 42.

The swivel connection 36 permits the rack 38 to be turned axially independently of the rack 34, so that the gear 40 and the shaft 42 may be arranged at different inclinations to suit the inclination of the fender aprons on different motor vehicles.

The racks 34 and 38 are inclosed in a dust-proof housing 50, provided with dust-proof housings 52 and 54 in which the gears 32 and 40, respectively, are arranged. The housing 50 is made in two sections, Fig. 5, connected by a union 56, which, upon being loosened, permits the rear section 58 to be turned axially with the housing 54, so that the gear 40 and the shaft 42 may be arranged at different inclinations, as above stated.

The shaft 42 is journaled in a dust-proof housing 60 connected at its lower portion to the chassis E, by a ball-and-socket 62 which readily accommodates itself to different inclinations of said housing 60.

From the foregoing description it is apparent that when the crank arm D of the steering mechanism is actuated to turn the front wheels F to the right or left in rounding a curve that the headlights 16 will be correspondingly turned through the intermediacy of the intervening mechanism above described and light up the road in advance of the motor vehicle.

The mechanism for tilting the headlights 16 up and down as indicated by dotted lines c and d, Fig. 3, to cast the light rays accordingly, will now be described.

64 designates an arm firmly secured upon one of the trunnions 8 of the frame 2. Said arm 64 is connected to a manually controlled lever 66 by a flexible connecting rod 68, slidably mounted in a snugly fitting flexible tube 70, fixed to the adjacent apron C. The lever 66 is fulcrumed at 72 on a segment 74 provided with clamps 76 whereby it may be secured to the steering post F, within convenient reach of the driver. The segment 74 has a serrated arcuate margin 78, Fig. 7, for engagement by a pair of latches 80 connected by a pivot 82 to the lever 66. The latches 80 have toothed portions 84 which are normally held in engagement with the serrated margin 78 by springs 86 carried by a lug 88 on the lever 72. By pressing the latches 80 towards each other the toothed portions 84 are disengaged from the serrated margin 78, leaving the lever 66 free to be moved upwardly or downwardly.

With the foregoing mechanism the headlights 16 may be tilted downwardly in the direction of the dotted line d, Fig. 3, by pushing upwardly on the lever 66, or tilted upwardly in the direction of the dotted line by pulling said lever 66 downwardly.

From the foregoing description taken in connection with the drawings, it is apparent that I have produced dirigible headlights embodying the advantages above pointed out, and while I have shown and described the preferred construction, combination and arrangement of parts, I reserve the right to make such changes as properly fall within the spirit and scope of the invention as claimed.

Having thus described my invention, what I claim and desire to secure by Letters Patent, is:

1. In dirigible headlights for motor vehicles, a frame in which a pair of headlights are mounted to turn to the right and left, means connecting said headlights to cause them to turn together, an inclined shaft mounted on the vehicle, a housing in which said shaft is mounted, self-adjusting means whereby said housing is connected to the vehicle, means connecting said shaft to the steering mechanism of the vehicle so that the latter may operate the former, a gear fixedly mounted upon said shaft, a rack actuated by said gear and axially adjustable to permit the gear and said shaft to be adjusted to different inclinations, and mechanism actuated by said rack for turning the headlights to the right or left.

2. In dirigible headlights for motor vehicles, a frame in which a pair of headlights are mounted to turn to the right and left, means connecting said headlights to cause them to turn together, an inclined shaft mounted on the vehicle, means connecting said shaft to the steering mechanism of the vehicle so that the latter may operate the former, a gear fixedly mounted upon said shaft, a rack actuated by said gear and axially adjustable to permit the gear and said shaft to be adjusted to different inclinations, a second rack adjustably connected to the first one to permit of independent axial adjustment, and mechanism actuated by said second rack for turning the headlights to the right or left.

3. In dirigible headlights for motor vehicles, a frame in which a pair of headlights are mounted to turn to the right and left, means connecting said headlights to cause them to turn together, an inclined shaft mounted on the vehicle, means connecting said shaft to the steering mechanism of the vehicle so that the latter may operate the former, a gear fixedly mounted upon said shaft, a rack actuated by said gear and axially adjustable to permit the gear and said shaft to be adjusted to different inclinations, a second rack adjustably connected to the first one to permit of independent axial adjustment, a gear actuated by said second rack, mechanism actuated by the last-mentioned gear for turning the headlights to the right or left, housings in which the two gears are located, and a tubular housing enclosing the racks and carrying said gear housings and formed of two sections capable of independent axial adjustment to permit the gears to be adjusted with the respective racks.

4. In dirigible headlights for motor vehicles, a frame in which a pair of headlights are mounted to turn to the right and left, means connecting said headlights to cause them to turn together, an inclined shaft mounted on the vehicle, means connecting said shaft to the steering mechanism of the vehicle so that the latter may operate the former, a gear fixedly mounted upon said shaft, a rack actuated by said gear and axially adjustable to permit the gear and said rack to be adjusted to different inclinations, a second rack adjustably connected to the first one to permit of independent axial adjustment, a gear actuated by said second rack, housings in which the two gears are located, a tubular housing enclosing the racks and carrying said gear housings and formed of two sections capable of independent axial adjustment to permit the gear to be adjusted with the respective racks, means for rigidly locking the two sections of said tubular housing together, a shaft journaled in the headlight frame and upon which said second gear is mounted, a segmental gear fixed to said shaft, and a rack intermeshing with said segmental gear and fixed to one of the headlights to turn the same to the right or left.

In testimony whereof I affix my signature.

JOHN M. DORTON.